United States Patent
Lee et al.

(10) Patent No.: US 11,871,066 B2
(45) Date of Patent: Jan. 9, 2024

(54) DISPLAY DEVICE AND DISPLAY SYSTEM

(71) Applicant: LG ELECTRONICS INC., Seoul (KR)

(72) Inventors: Kyungryun Lee, Seoul (KR); Miyeon Kwon, Seoul (KR)

(73) Assignee: LG ELECTRONICS INC., Seoul (KR)

(*) Notice: Subject to any disclaimer, the term of this patent is extended or adjusted under 35 U.S.C. 154(b) by 290 days.

(21) Appl. No.: 17/187,576

(22) Filed: Feb. 26, 2021

(65) Prior Publication Data

US 2022/0217436 A1 Jul. 7, 2022

(30) Foreign Application Priority Data

Jan. 7, 2021 (KR) .................. 10-2021-0002101

(51) Int. Cl.
*H04N 21/422* (2011.01)
*H04N 21/443* (2011.01)
*H04N 5/63* (2006.01)

(52) U.S. Cl.
CPC ......... *H04N 21/42221* (2013.01); *H04N 5/63* (2013.01); *H04N 21/4432* (2013.01)

(58) Field of Classification Search
CPC ............... H04N 21/42221; H04N 5/63; H04N 21/4432; H04N 21/4104; H04N 21/42204; H04N 21/43615; H04N 21/43637

See application file for complete search history.

(56) References Cited

U.S. PATENT DOCUMENTS

| | | | | |
|---|---|---|---|---|
| 10,623,799 | B2* | 4/2020 | Lee | ................. H04N 21/47 |
| 2005/0262535 | A1* | 11/2005 | Uchida | ............ H04N 21/41265 348/E5.103 |
| 2018/0091851 | A1* | 3/2018 | Bae | ................. H04N 21/42204 |
| 2018/0167577 | A1* | 6/2018 | Ryu | ................. H04N 21/485 |
| 2018/0316981 | A1 | 11/2018 | Kim | |

FOREIGN PATENT DOCUMENTS

| | | |
|---|---|---|
| KR | 101304805 | 9/2013 |
| KR | 101489811 | 2/2015 |

OTHER PUBLICATIONS

PCT International Application No. PCT/KR2021/001633, International Search Report dated Oct. 1, 2021, 4 pages.

* cited by examiner

*Primary Examiner* — Oschta I Montoya
(74) *Attorney, Agent, or Firm* — LEE, HONG, DEGERMAN, KANG & WAIMEY

(57) ABSTRACT

The present disclosure aims to synchronize the power states of a display device and an external device connected to the display device. The display device includes an external device interface connected to an external device, a user input interface configured to receive a power signal from a remote control device, and a controller configured to process the power signal to control power of the display device to be turned on or off. When the power signal is received, the controller is configured to determine whether to process the power signal based on whether a signal is inputted from the external device.

13 Claims, 10 Drawing Sheets

DISPLAY DEVICE AND DISPLAY SYSTEM

CROSS-REFERENCE TO RELATED APPLICATIONS

Pursuant to 35 U.S.C. § 119(a), this application claims the benefit of earlier filing date and right of priority to Korean Patent Application No. 10-2021-0002101 filed on Jan. 7, 2021, the contents of which are hereby incorporated by reference herein in its entirety.

BACKGROUND

The present disclosure relates to a display device and a display system.

Recently, a digital TV service using a wired or wireless communication network has come into wide use. The digital TV service may provide various services which cannot be provided by an existing analog broadcast service.

For example, an Internet protocol television (IPTV) service or a smart TV service which is a digital TV service provides interactivity for enabling a user to actively select a type of a program to be viewed, a viewing time, etc. The IPTV service or the smart TV service may provide various additional services, e.g., Internet search, home shopping, online games, etc. based on such interactivity.

In general, such an IPTV is supported in a form in which an external device such as a set-top box is connected to a display device. In order to allow users to control a display device and a set-top box connected thereto more conveniently, when a power button of a remote control device (remote controller) is pressed, the remote control device may transmit an IR signal for controlling power to each of the display device and the set-top box. Each of the display device and the set-top box may receive an IR signal and control power to be turned on or off.

Meanwhile, only one of the display device and the set-top box may not be able to receive the IR signal due to a directivity problem or a device status. In this case, the power of one of the display device and the set-top box is turned on, but the other power is turned off, so that power synchronization is not performed.

In addition, when the power button of the remote control device is pressed again without power synchronization, the remote control device transmits the IR signal for controlling the power to each of the display device and the set-top box. Thus, the device that is in a power-on state is turned off, and the device that is in a power-off state is turned on. Consequently, the problem of the power state mismatch occurs repeatedly.

Meanwhile, as the prior art for improving the above-described problem, Korean Patent Registration No. 10-2094252 discloses a configuration for transmitting and receiving ultrasonic audio signals or signals of inaudible frequencies. In this case, there is a problem in that various signals such as ultrasonic audio signals or signals of inaudible frequencies are excessively released in the air.

SUMMARY

The present disclosure aims to solve the above-described problems.

The present disclosure aims to synchronize power states of a display device and an external device connected to the display device. In more detail, the present disclosure attempts to synchronize power of a display device with power of an external device connected to the display device with one power button provided in a remote control device.

The present disclosure aims to solve a problem in which power supplies of a display device and an external device connected to the display device operate reversely.

A display device according to an embodiment of the present disclosure comprises an external device interface connected to an external device, a user input interface configured to receive a power signal from a remote control device, and a controller configured to process the power signal to control power of the display device to be turned on or off, wherein, when the power signal is received, the controller is configured to determine whether to process the power signal based on whether a signal is inputted from the external device.

The power signal is a power control signal transmitted via infrared ray (IR) for controlling the power of the display device, and wherein the controller is configured to process the power control signal according to the presence or absence of the signal inputted from the external device.

When the power control signal is received in a state in which an elapsed time after the power of the display device is switched to on is within a reference time and the signal is not inputted from the external device, the controller is configured to maintain the power of the display device in an on state for a predetermined time after the power control signal is received.

When the power control signal is received in a state in which an elapsed time after the power of the display device is switched to on is within a reference time and the signal is not inputted from the external device, the controller is configured not to process a power control signal received for a predetermined time after the power control signal is received.

When the predetermined time has elapsed, the controller is configured to control the power of the display device to be turned off according to the received power control signal.

When the power control signal is received in a state in which the elapsed time after the power of the display device is switched to on is after the reference time and the signal is inputted from the external device, the controller is configured to maintain the power of the display device in an on state for a predetermined time after the power control signal is received.

When the power control signal is received in a state in which the elapsed time after the power of the display device is switched to on is after the reference time and the signal is inputted from the external device, the controller is configured not to process a power control signal received for a predetermined time after the power control signal is received.

When the predetermined time has elapsed or when the signal is not inputted from the external device before the elapse of the predetermined time, the controller is configured to control the power of the display device to be turned off.

The power signal is a power button detection signal of the remote control device transmitted through Bluetooth communication, and wherein the controller is configured to control the remote control device not to transmit the power control signal to the display device according to the presence or absence of the signal inputted from the external device.

When the power button detection signal is received in a state in which an elapsed time after the power of the display device is switched to on is within a reference time and the signal is not inputted from the external device, the controller is configured to control the remote control device to transmit a power control signal for controlling only the external device for a predetermined time after the power button detection signal is received.

When the power button detection signal is received in a state in which an elapsed time after the power of the display device is switched to on is within a reference time and the signal is inputted from the external device, the controller is configured to control the power of the display device to be turned off for a predetermined time after the power control signal is received.

When the power button detection signal is received in a state in which an elapsed time after the power of the display device is switched to on is after a reference time and the signal is inputted from the external device, the controller is configured to control the remote control device to transmit a power control signal for controlling only the external device.

When the power button detection signal is received in a state in which an elapsed time after the power of the display device is switched to on is after a reference time and the signal is inputted from the external device, the controller is configured to control the power of the display device to be turned off according to the power button detection signal.

A display system according to an embodiment of the present disclosure comprises a display device connected to an external device, and a remote control device configured to transmit a power signal to the display device, wherein, when the power signal is received from the remote control device, the display device is configured to determine whether to process the power signal based on whether a signal is inputted from the external device.

The remote control device is configured to when an input of a power button is detected, determine a power state of the display device based on whether the remote control device is connected to the display device via Bluetooth, and transmit a power signal to the display device through infrared ray (IR) or Bluetooth communication according to the power state of the display device.

The details of one or more embodiments are set forth in the accompanying drawings and the description below. Other features will be apparent from the description and drawings, and from the claims.

DETAILED DESCRIPTION OF THE EMBODIMENTS

Hereinafter, embodiments relating to the present disclosure will be described in detail with reference to the accompanying drawings. The suffixes "module" and "interface" for components used in the description below are assigned or mixed in consideration of easiness in writing the specification and do not have distinctive meanings or roles by themselves.

Figure 1:
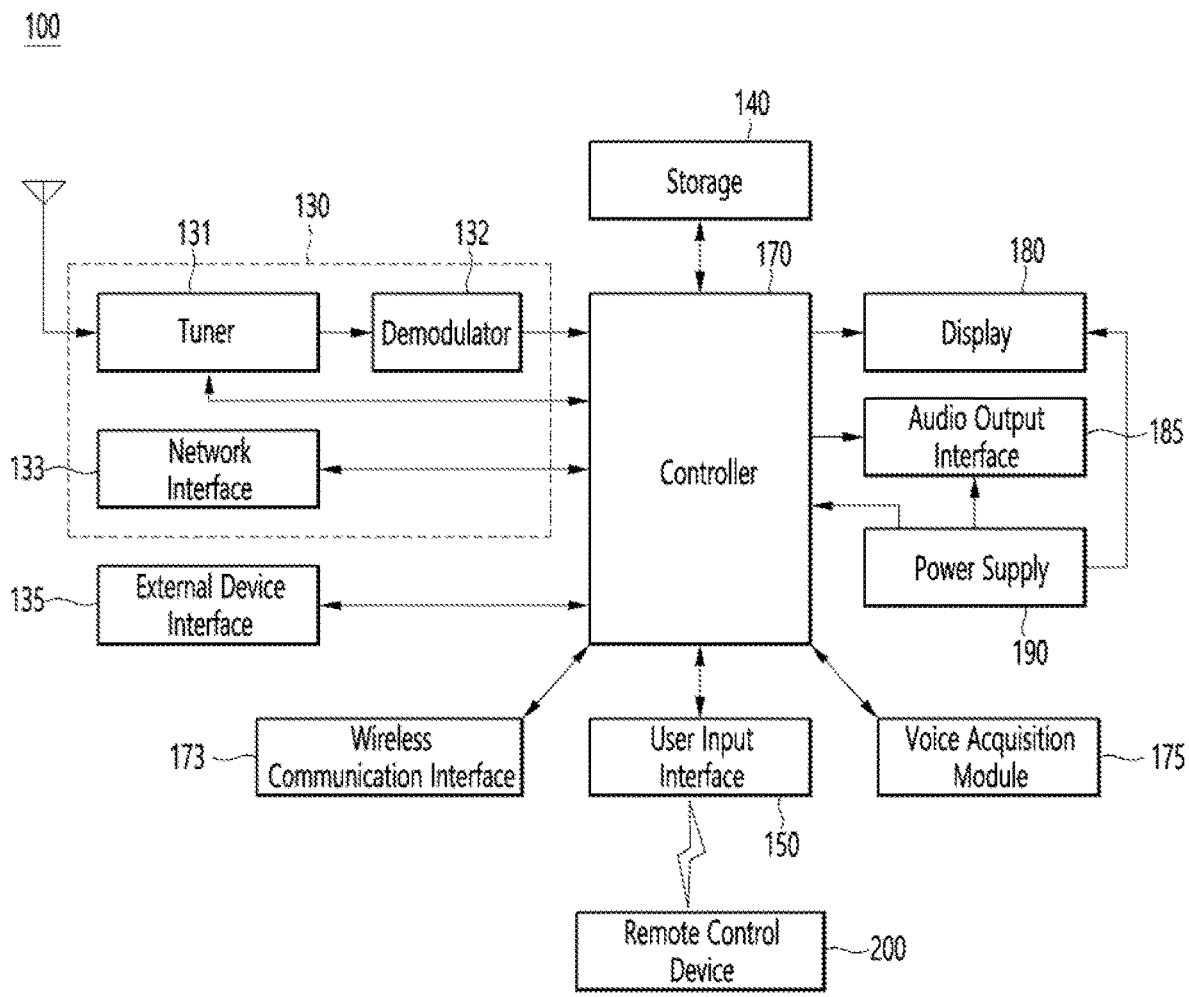
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 can include a broadcast reception module 130, an external device interface 135, a storage 140, a user input interface 150, a controller 170, a wireless communication interface 173, a voice acquisition module 175, a display 180, an audio output interface 185, and a power supply 190.

The broadcast reception module 130 can include a tuner 131, a demodulator 132, and a network interface 133.

The tuner 131 can select a specific broadcast channel according to a channel selection command. The tuner 131 can receive broadcast signals for the selected specific broadcast channel.

The demodulator 132 can divide the received broadcast signals into video signals, audio signals, and broadcast program related data signals and restore the divided video signals, audio signals, and data signals to an output available form.

The network interface 133 can provide an interface for connecting the display device 100 to a wired/wireless network including internet network. The network interface 133 can transmit or receive data to or from another user or another electronic device through an accessed network or another network linked to the accessed network.

The network interface 133 can access a predetermined webpage through an accessed network or another network linked to the accessed network. That is, it can transmit or receive data to or from a corresponding server by accessing a predetermined webpage through network.

Then, the network interface 133 can receive contents or data provided from a content provider or a network operator. That is, the network interface 133 can receive contents such as movies, advertisements, games, VODs, and broadcast signals, which are provided from a content provider or a network provider, through network and information relating thereto.

Additionally, the network interface 133 can receive firmware update information and update files provided from a network operator and transmit data to an internet or content provider or a network operator.

The network interface 133 can select and receive a desired application among applications open to the air, through network.

The external device interface 135 can receive an application or an application list in an adjacent external device and deliver it to the controller 170 or the storage 140.

The external device interface 135 can provide a connection path between the display device 100 and an external device. The external device interface 135 can receive at least one of image and audio outputted from an external device that is wirelessly or wiredly connected to the display device 100 and deliver it to the controller. The external device interface 135 can include a plurality of external input terminals. The plurality of external input terminals can include an RGB terminal, at least one High Definition Multimedia Interface (HDMI) terminal, and a component terminal.

An image signal of an external device inputted through the external device interface 135 can be outputted through the display 180. A sound signal of an external device inputted through the external device interface 135 can be outputted through the audio output interface 185.

An external device connectable to the external device interface 135 can be one of a set-top box, a Blu-ray player, a DVD player, a game console, a sound bar, a smartphone, a PC, a USB Memory, and a home theater system but this is just exemplary.

Additionally, some content data stored in the display device 100 can be transmitted to a user or an electronic device, which is selected from other users or other electronic devices pre-registered in the display device 100.

The storage 140 can store signal-processed image, voice, or data signals stored by a program in order for each signal processing and control in the controller 170.

Additionally, the storage 140 can perform a function for temporarily store image, voice, or data signals outputted from the external device interface 135 or the network interface 133 and can store information on a predetermined image through a channel memory function.

The storage 140 can store an application or an application list inputted from the external device interface 135 or the network interface 133.

The display device 100 can play content files (for example, video files, still image files, music files, document files, application files, and so on) stored in the storage 140 and provide them to a user.

The user input interface 150 can deliver signals inputted from a user to the controller 170 or deliver signals from the controller 170 to a user. For example, the user input interface 150 can receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR.

Additionally, the user input interface 150 can deliver, to the controller 170, control signals inputted from local keys (not shown) such as a power key, a channel key, a volume key, and a setting key.

Image signals that are image-processed in the controller 170 can be inputted to the display 180 and displayed as an image corresponding to corresponding image signals. Additionally, image signals that are image-processed in the controller 170 can be inputted to an external output device through the external device interface 135.

Voice signals processed in the controller 170 can be outputted to the audio output interface 185. Additionally, voice signals processed in the controller 170 can be inputted to an external output device through the external device interface 135.

Besides that, the controller 170 can control overall operations in the display device 100.

Additionally, the controller 170 can control the display device 100 by a user command or internal program inputted through the user input interface 150 and download a desired application or application list into the display device 100 in access to network.

The controller 170 can output channel information selected by a user together with processed image or voice signals through the display 180 or the audio output interface 185.

Additionally, according to an external device image playback command received through the user input interface 150, the controller 170 can output image signals or voice signals of an external device such as a camera or a camcorder, which are inputted through the external device interface 135, through the display 180 or the audio output interface 185.

Moreover, the controller 170 can control the display 180 to display images and control broadcast images inputted through the tuner 131, external input images inputted through the external device interface 135, images inputted through the network interface, or images stored in the storage 140 to be displayed on the display 180. In this case, an image displayed on the display 180 can be a still image or video and also can be a 2D image or a 3D image.

Additionally, the controller 170 can play content stored in the display device 100, received broadcast content, and external input content inputted from the outside, and the content can be in various formats such as broadcast images, external input images, audio files, still images, accessed web screens, and document files.

Moreover, the wireless communication interface 173 can perform a wired or wireless communication with an external electronic device. The wireless communication interface 173 can perform short-range communication with an external device. For this, the wireless communication interface 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication interface 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication interface 173 can detect (or recognize) a communicable wearable device around the display device 100. Furthermore, if the detected wearable device is a device authenticated to communicate with the display device 100, the controller 170 can transmit at least part of data processed in the display device 100 to the wearable device through the wireless communication interface 173. Accordingly, a user of the wearable device can use the data processed in the display device 100 through the wearable device.

The voice acquisition module 175 can acquire audio. The voice acquisition module 175 may include at least one microphone (not shown), and can acquire audio around the display device 100 through the microphone (not shown).

The display 180 can convert image signals, data signals, or OSD signals, which are processed in the controller 170, or images signals or data signals, which are received in the external device interface 135, into R, G, and B signals to generate driving signals.

Furthermore, the display device 100 shown in FIG. 1 is just one embodiment of the present disclosure and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface 133 or the external device interface 135 and play them without including the tuner 131 and the demodulator 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present disclosure described below can be performed by one of the display device described with reference to FIG. 1, an image processing device such as the separated set-top box, and a content playback device including the display 180 and the audio output interface 185.

The audio output interface 185 receives the audio processed signal from the controller 170 and outputs the sound.

The power supply 190 supplies the corresponding power throughout the display device 100. In particular, the power supply 190 supplies power to the controller 170 that can be implemented in the form of a System On Chip (SOC), a display 180 for displaying an image, and the audio output interface 185 for outputting audio or the like.

Specifically, the power supply 190 may include a converter for converting an AC power source into a DC power source, and a DC/DC converter for converting a level of the DC source power.

Figure 2:
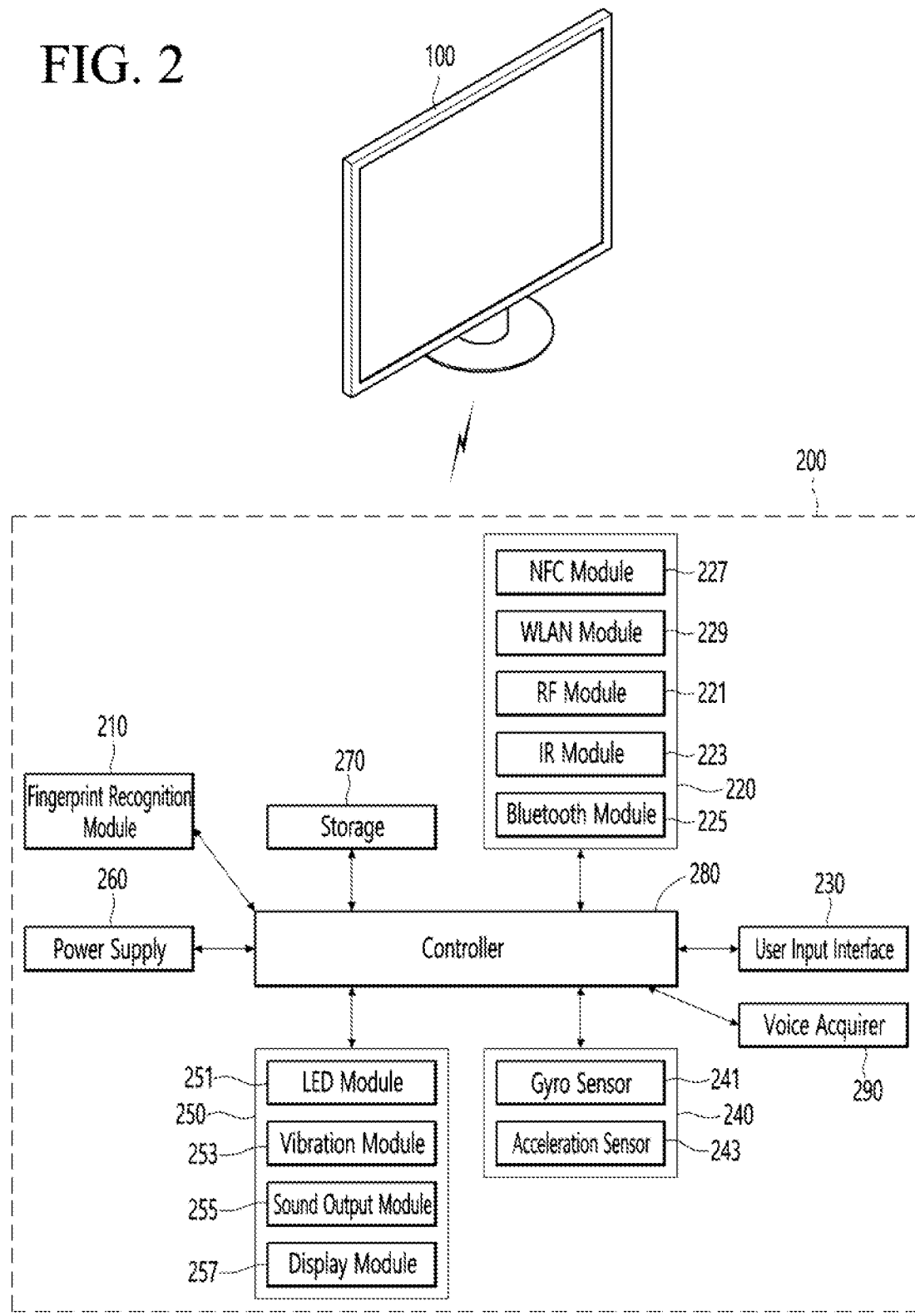
FIG. 2 is a block diagram illustrating a remote control device according to an embodiment of the present disclosure.
Figure 3:
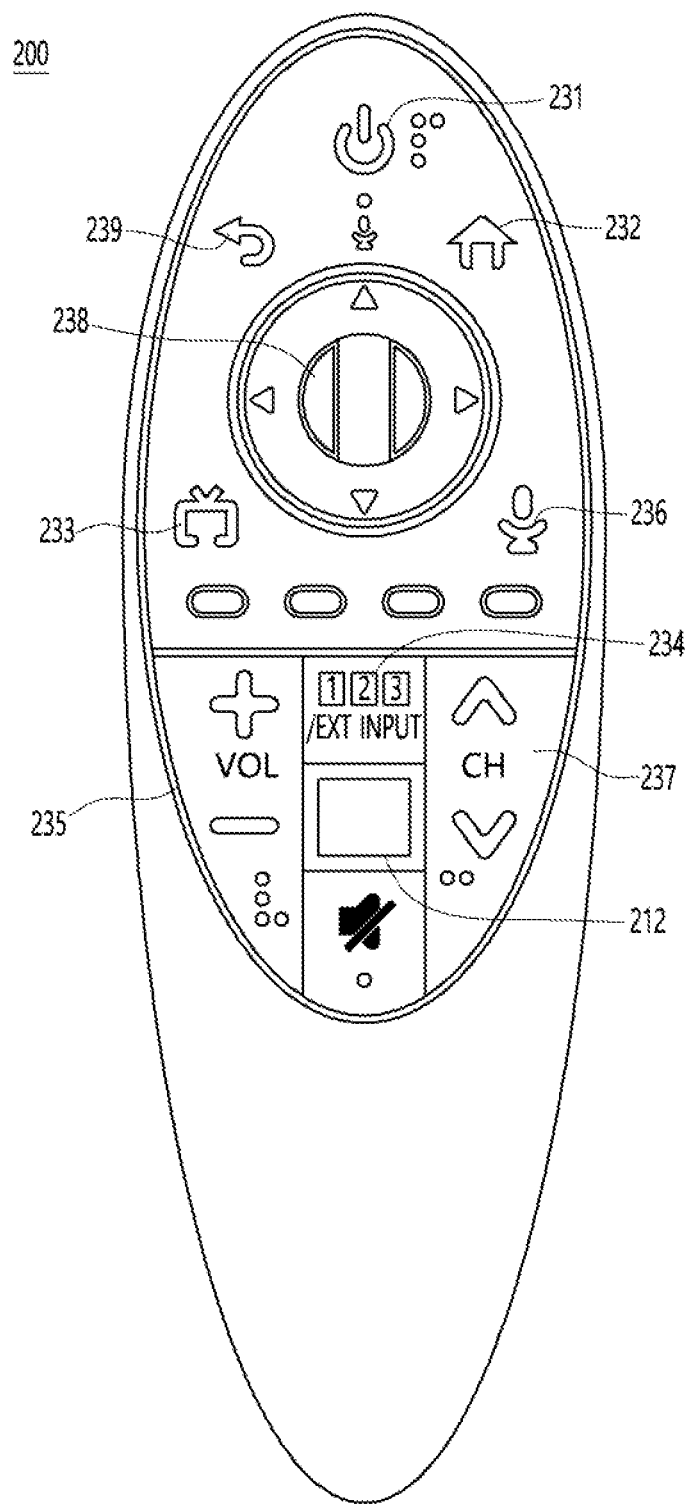
FIG. 3 is a view illustrating an actual configuration of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 can include a fingerprint recognition module 210, a wireless communication interface 220, a user input interface 230, a sensor 240, an output interface 250, a power supply 260, a storage 270, a controller 280, and a voice acquisition module 290.

Referring to FIG. 2, the wireless communication interface 220 transmits/receives signals to/from an arbitrary any one of display devices according to the above-mentioned embodiments of the present disclosure.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards Additionally, the remote control device 200 can transmit signals containing information on a movement of the remote control device 200 to the display device 100 through the wireless communication interface 220.

Moreover, the remote control device 200 can receive signals transmitted from the display device 100 through the RF module 221 and if necessary, can transmit a command on power on/off, channel change, and volume change to the display device 100 through the IR module 223.

The user input interface 230 can be configured with a keypad button, a touch pad, or a touch screen. A user can manipulate the user input interface 230 to input a command relating to the display device 100 to the remote control device 200. If the user input interface 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be button for turning on/off the power of the display device 100. The power button 231 can be button for moving to the home screen of the display device 100. The live button 233 can be a button for displaying live broadcast programs. The external input button 234 can be button for receiving an external input connected to the display device 100. The voice adjustment button 235 can be button for adjusting the size of a volume outputted from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described.

If the user input interface 230 includes a touch screen, a user can touch a soft key of the touch screen to input a command relating to the display device 100 to the remote control device 200. Additionally, the user input interface 230 can include various kinds of input means manipulated by a user, for example, a scroll key and a jog key, and this embodiment does not limit the scope of the present disclosure.

The sensor 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display 180 of the display device 100.

The output interface 250 can output image or voice signals corresponding to a manipulation of the user input interface 230 or corresponding to signals transmitted from the display device 100. A user can recognize whether the user input interface 230 is manipulated or the display device 100 is controlled through the output interface 250.

For example, the output interface 250 can include an LED module 251 for flashing, a vibration module 253 for generating vibration, a sound output module 255 for outputting sound, or a display module 257 for outputting an image, if the user input interface 230 is manipulated or signals are transmitted/received to/from the display device 100 through the wireless communication interface 220.

Additionally, the power supply 260 supplies power to the remote control device 200 and if the remote control device 200 does not move for a predetermined time, stops the power supply, so that power waste can be reduced. The power supply 260 can resume the power supply if a predetermined key provided at the remote control device 200 is manipulated.

The storage 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 can store, in the storage 270, information on a frequency band for transmitting/receiving signals to/from the display device 100 paired with the remote control device 200 and refer to it.

The controller 280 controls general matters relating to a control of the remote control device 200. The controller 280 can transmit a signal corresponding to a predetermined key manipulation of the user input interface 230 or a signal corresponding to a movement of the remote control device 200 sensed by the sensor 240 to the display device 100 through the wireless communication interface 220.

Additionally, the voice acquisition module 290 of the remote control device 200 can obtain voice.

The voice acquisition module 290 can include at least one microphone 291 and obtain voice through the microphone 291.

Figure 4:
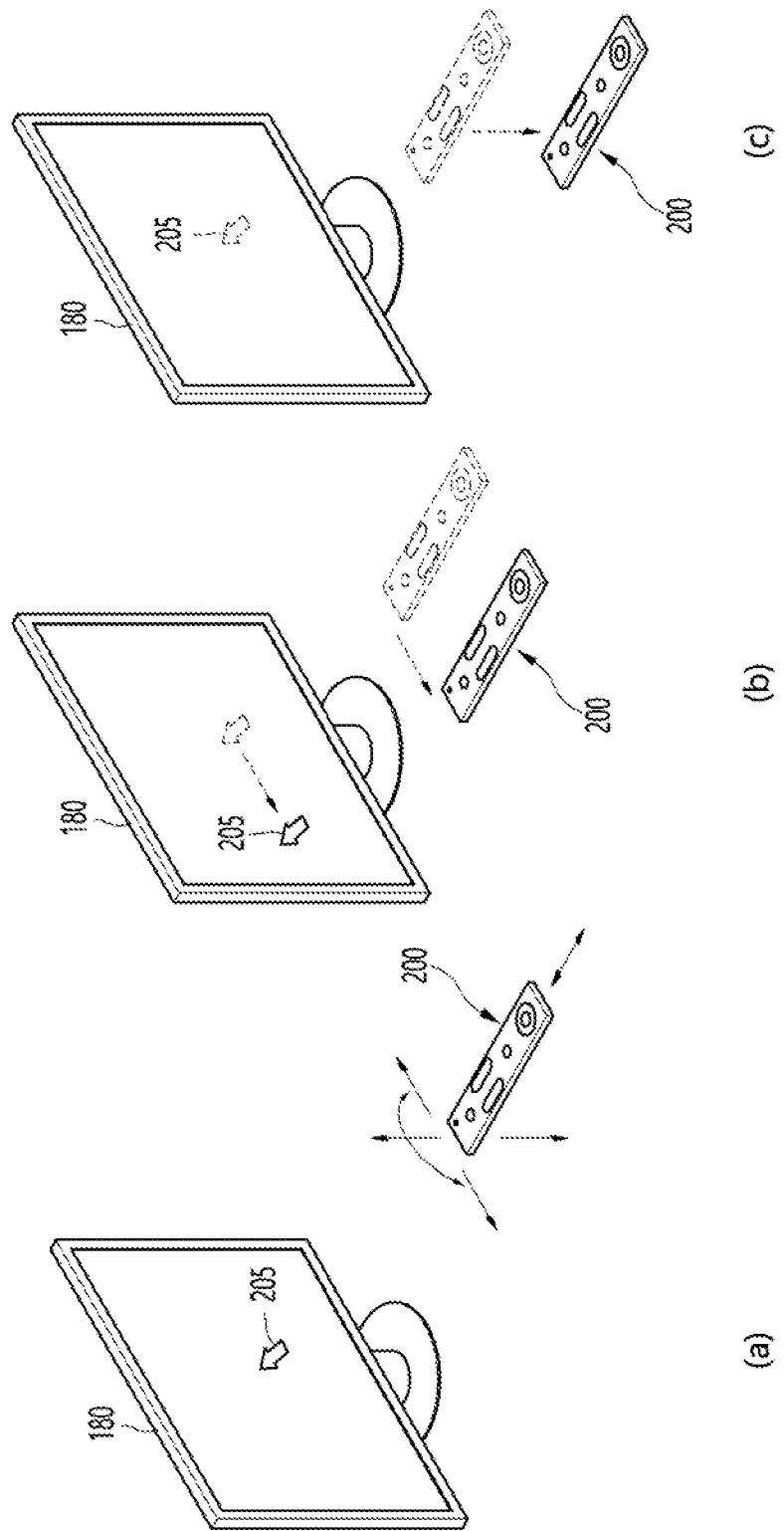
FIG. 4 is a view of utilizing a remote control device according to an embodiment of the present disclosure.

Then, FIG. 4 is described.

FIG. 4 is a view of utilizing a remote control device according to an embodiment of the present disclosure.

FIG. 4A illustrates that a pointer 205 corresponding to the remote control device 200 is displayed on the display 180.

A user can move or rotate the remote control device 200 vertically or horizontally. The pointer 205 displayed on the display 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4B illustrates that if a user moves the remote control device 200, the pointer 205 displayed on the display 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4C illustrates that while a specific button in the remote control device 200 is pressed, a user moves the remote control device 200 away from the display 180. Thus, a selection area in the display 180 corresponding to the pointer 205 can be zoomed in and displayed largely.

On the other hand, if a user moves the remote control device 200 close to the display 180, a selection area in the display 180 corresponding to the pointer 205 can be zoomed out and displayed reduced.

On the other hand, if the remote control device 200 is away from the display 180, a selection area can be zoomed out and if the remote control device 200 is close to the display 180, a selection area can be zoomed in.

Additionally, if a specific button in the remote control device 200 is pressed, the recognition of a vertical or horizontal movement can be excluded. That is, if the remote control device 200 is moved away from or close to the display 180, the up, down, left, or right movement can not be recognized and only the back and fourth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display 180 and also can be displayed in correspondence to a plurality of points such as a line and a surface.

The remote control device 200 may operate as an integrated remote controller. The integrated remote controller may refer to a remote control device capable of controlling both the display device 100 and an external device connected to the display device 100. The external device may refer to a device connected through the external device interface 135. For example, the remote control device 200 may operate as an integrated remote controller capable of controlling the display device 100 and a set-top box connected to the display device 100.

In order for the remote control device 200 to operate as an integrated remote controller, a series of integrated remote controller setting procedures may be required. Hereinafter, it is assumed that the remote control device 200 to be described later is an integrated remote controller set to control both the display device 100 and the external device such as the set-top box.

When the power button 231 is input as illustrated in FIG. 3, an IR signal (infrared ray signal) for turning on/off power may be transmitted to the display device 100 and the external device. However, only one of the display device 100 and the external device may receive the IR signal due to various causes, and in this case, there may be a problem that the power of the display device 100 and the power of the external device operate differently. Examples of various causes may include a directivity problem of an IR signal, a device internal state, and the like, but this is only an example.

As described above, as long as the power of the display device 100 and the power of the external device are once controlled differently, a state in which the power of the display device 100 and the power of the external device operates differently is repeated unless the power of either the display device 100 or the external device is separately changed. Therefore, there is a problem in that a user has to separately control any one power source in order to match the power states of the display device 100 and the external device.

Accordingly, the display device 100 and the display system according to the embodiment of the present disclosure attempt to synchronize the power states of the display device 100 and the external device connected to the display device 100 only by inputting the power button 231 provided in the remote control device 200.

More specifically, the controller 170 of the display device 100 may control power of the display device 100 to be turned on or off according to the control signal received from the remote control device 200. In particular, when receiving the control signal from the remote control device 200, the controller 170 may determine whether to process the power signal based on whether the signal is inputted from the external device 300. The power signal may be a power control signal or a power button detection signal, the power control signal may be a signal transmitted from the remote control device 200 via IR so that the power of the display device 100 is controlled, and the power button detection signal may be a signal transmitted via Bluetooth so as to inform the display device 100 whether the power button 231 provided in the remote control device 200 is inputted.

Meanwhile, in the present disclosure, the display system may include at least the display device 100 and the remote control device 200.

Figure 5:
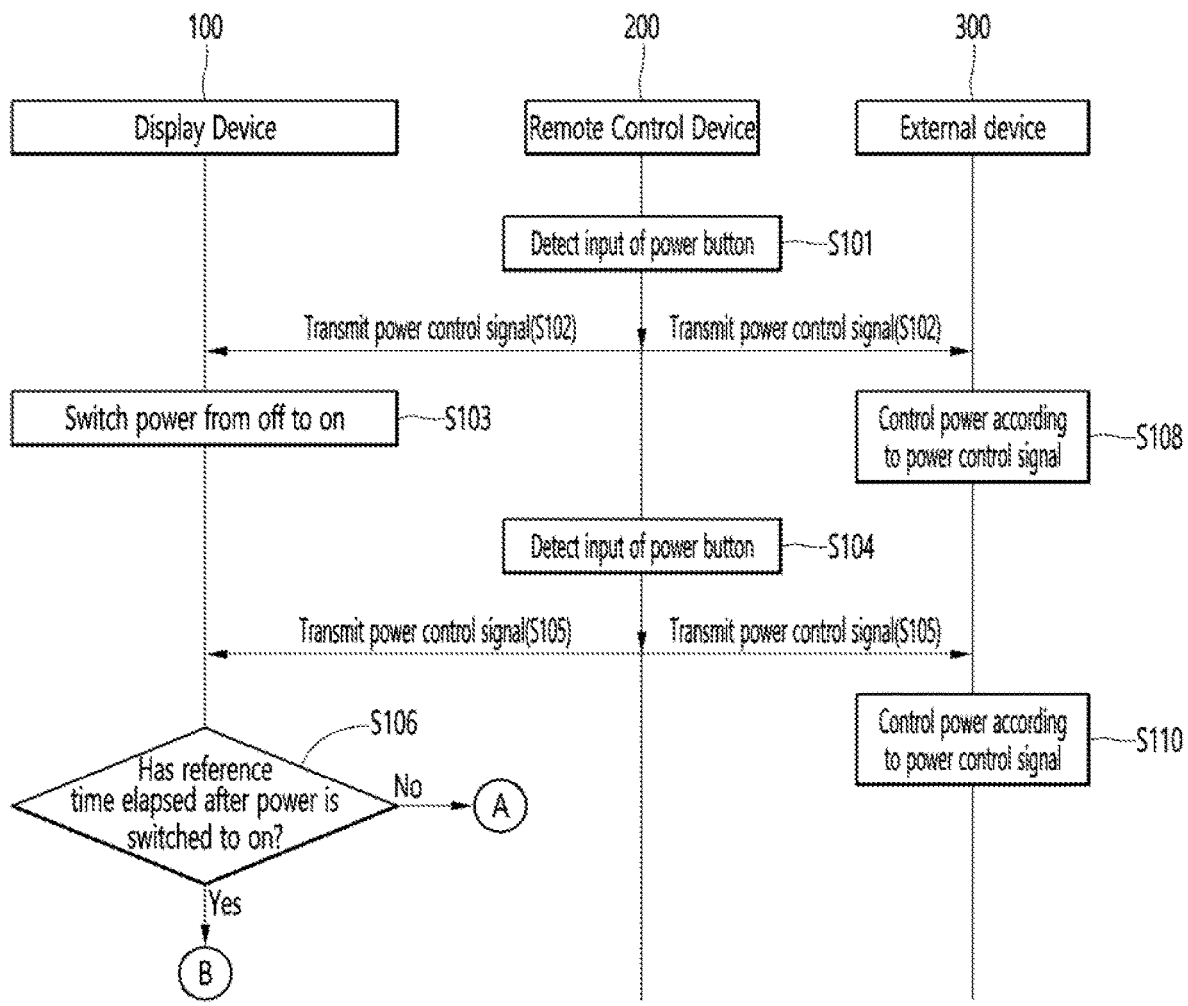
FIGS. 5 to 7 are flowcharts illustrating an operating method of a display system according to a first embodiment of the present disclosure.
Figure 6:
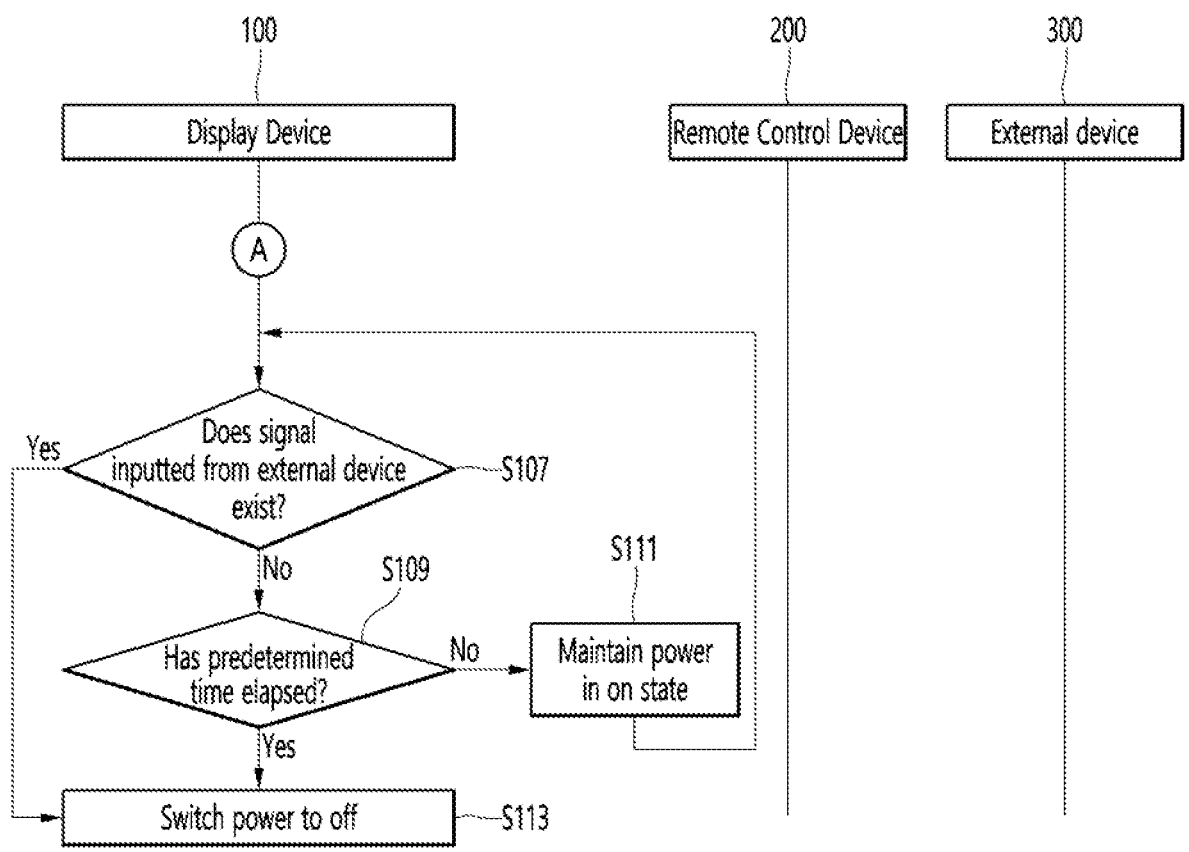
Figure 7:
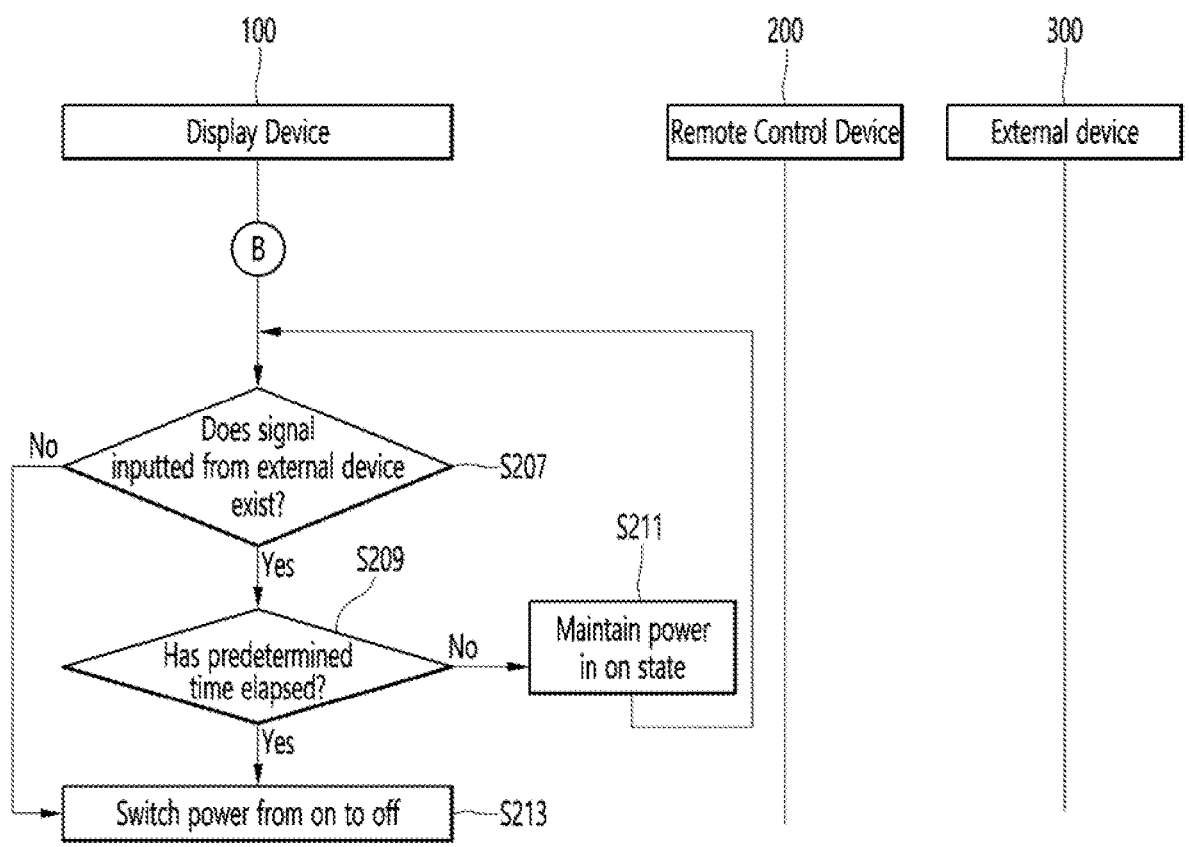

FIGS. 5 to 7 are flowcharts illustrating an operating method of a display system according to a first embodiment of the present disclosure.

Referring to FIG. 5, the remote control device 200 may detect the input of the power button 231 (S101).

According to the first embodiment of the present disclosure, when the input of the power button 231 is detected, the remote control device 200 may transmit a power control signal to each of the display device 100 and the external device 300 (S102).

The external device 300 refers to a device connected to the display device 100 by wire or wirelessly. For example, the external device 300 may be a set-top box connected to the display device 100 by HDMI, but this is only an example, and the external device 300 is not limited thereto. That is, the external device 300 may have various types such as a DVD player in addition to the set-top box, and a method of connecting to the display device 100 is also not limited to HDMI.

The power control signal transmitted from the remote control device 200 to each of the display device 100 and the external device 300 may be an IR signal (infrared ray signal).

The remote control device 200 may sequentially transmit an IR signal to the display device 100 and the external device 300, and the order of transmitting the IR signal may be changed.

The external device 300 may control power by receiving the power control signal from the remote control device 200. Specifically, the external device 300 may change the power state of the external device 300 when receiving the power control signal. For example, when the external device 300 receives the power control signal in the power on state, the external device 300 may switch the power from on to off, and when the external device 300 receives the power control signal in the power off state, the external device 300 may switch the power from off to on. That is, in operations S108 and S110, the external device 300 may control power according to the received power control signal.

Likewise, the display device 100 may receive the power control signal from the remote control device 200. When the display device 100 receives the power control signal, the display device 100 may change the power state. For example, if the display device 100 receives the power control signal when the power is on, the display device 100 may switch the power from on to off, and if the display device 100 receives the power control signal when the power is off, the display device 100 may switch the power from off to on.

In operation S102, it is assumed that the display device 100 receives the power control signal from the remote control device 200 when the power is turned off. Accordingly, when the display device 100 receives the power control signal from the remote control device 200, the display device 100 may switch the power from off to on (S103).

Specifically, the display device 100 may receive the power control signal from the remote control device 200 through the user input interface 150, and the controller 170 may process the power control signal to switch the power of the display device 100 from off to on.

Even after the power of the display device 100 is turned on, the remote control device 200 may detect the input of the power button 231 (S104).

When the input of the power button 231 is detected, the remote control device 200 may transmit the power control signal to each of the display device 100 and the external device 300 (S105).

When the controller 170 of the display device 100 receives the power control signal in the power on state, the controller 170 may determine whether a reference time has elapsed after the power is switched to on (S106).

The controller 170 may determine whether the elapsed time after the power is switched to on is within a reference time.

The reference time may refer to a time that is a criterion for determining the intention of the user to press the power button 231. For example, the reference time may be 6 seconds, but this is only an example and the present disclosure is not limited thereto.

When the elapsed time after the power is switched to on is within the reference time, the controller 170 may determine that the received power control signal is a signal for synchronizing the powers of both the display device 100 and the external device 300 to on. Meanwhile, when the reference time has elapsed after the power is switched to on, the controller 170 may determine that the received power control signal is a signal for synchronizing the powers of both the display device 100 and the external device 300 to off.

First, a case in which the controller 170 receives the power control signal in a state in which the elapsed time after the power is switched to on is within the reference time will be described in detail.

FIG. 6 is a flowchart illustrating a method by which a display device is operated to be controlled to power-on with an external device according to a first embodiment of the present disclosure.

Referring to FIG. 6, when the controller 170 of the display device 100 receives the power control signal in a state in which the elapsed time after the power is switched to on is within the reference time, the controller 170 may determine that the signal inputted from the external device 300 exists (S107).

That is, the controller 170 may detect the signal inputted from the external device 300 and determine whether the signal inputted from the external device 300 exists.

When the external device 300 is in the power on state, the external device 300 may output a signal (e.g., an HDMI signal) to the display device 100. In contrast, when the external device 300 is in the power off state, the external device 300 cannot output a signal to the display device 100.

When the signal inputted from the external device 300 does not exist, the controller 170 of the display device 100 may determine whether a predetermined time has elapsed (S109).

The predetermined time may refer to a reference time for grasping the intention of power synchronization between the display device 100 and the external device 300. For example, the predetermined time may be 6 seconds, but this is exemplary for convenience of description and the present disclosure is not limited thereto.

The controller 170 may determine whether a predetermined time has elapsed by counting a time from a time point when the power control signal is transmitted or a time point when the power is switched from off to on according to the power control signal. That is, the reference time point at which the controller 170 starts counting the predetermined time may be changed according to embodiments.

When the signal inputted from the external device 300 is not detected and the predetermined time has not elapsed, the controller 170 may maintain the power in an on state (S111).

Specifically, when no signal is inputted from the external device 300, the controller 170 may not process the power control signal received for a predetermined time. When no signal is inputted from the external device 300, the controller 170 may ignore the power control signal for a predetermined time.

That is, the display device 100 may ignore the signal because the display device 100 determines that the power control signal received for a predetermined time when no signal is inputted from the external device 300 is transmitted by the input of the power button 231 for turning on the power of the external device 300.

Therefore, when the user inputs the power button 231, but only the power of the display device 100 is turned on and the power of the external device 300 is not turned on, the user may input the power button 231 again within a predetermined time, so as to control the powers of both the display device 100 and the external device 300 to be turned on. That is, according to the present disclosure, there is an advantage of providing user convenience that enables the user to synchronize the powers of the display device 100 and the external device 300 to on just by inputting the power button 231 again.

Meanwhile, when the signal inputted from the external device 300 exists, the controller 170 may switch the power to off (S113).

Since this is the case in which the power control signal is received when both the display device 100 and the external device 300 are in the power on state, the received power control signal is recognized as the signal for turning off the power of the display device 100.

In addition, when the signal inputted from the external device 300 does not exist, but the power control signal is received after a predetermined time has elapsed, the controller 170 may switch the power to off (S113).

Similarly, since this is the case in which the power control signal is received after a predetermined time has elapsed from the power-on of the display device 100, the received power control signal is recognized as the signal for turning off the power of the display device 100.

Next, a case in which the controller 170 receives the power control signal in a state in which the reference time has elapsed after the power is switched to on will be described in detail.

FIG. 7 is a flowchart illustrating a method of operating a display device to control power-off with an external device according to a first embodiment of the present disclosure.

Referring to FIG. 7, when the controller 170 of the display device 100 receives the power control signal in a state in which the reference time has elapsed after the power is switched to on, the controller 170 may determine that the signal inputted from the external device 300 exists (S207).

As described above with reference to operation S107, the controller 170 may detect the signal inputted from the external device 300 and determine whether the signal inputted from the external device 300 exists.

When the external device 300 is in the power on state, the external device 300 may output a signal (e.g., an HDMI signal) to the display device 100. In contrast, when the external device 300 is in the power off state, the external device 300 cannot output a signal to the display device 100.

When the signal inputted from the external device exists, the controller 170 of the display device 100 may determine whether a predetermined time has elapsed (S209).

As described above with reference to FIG. 6, the predetermined time refers to a reference time for grasping the intention of power synchronization between the display device 100 and the external device 300. The predetermined time may be 6 seconds, but this is only an example for convenience of description, and the present disclosure is not limited thereto. The controller 170 may determine whether a predetermined time has elapsed by counting a time from a time point when the power control signal is transmitted or a time point when the power is switched from off to on according to the power control signal. That is, the reference time point at which the controller 170 starts counting the predetermined time may be changed according to embodiments.

When the signal inputted from the external device 300 is detected and the predetermined time has not elapsed, the controller 170 may maintain the power in an on state (S211).

Specifically, when the signal is inputted from the external device 300, the controller 170 may not process the power control signal received for a predetermined time. When the signal is inputted from the external device 300, the controller 170 may ignore the power control signal for a predetermined time.

That is, when the signal is inputted from the external device 300, it is difficult for the display device 100 to determine whether the user intends to turn off the power of the display device 100. Therefore, the display device 100 may ignore the power control signal received for a predetermined time and delay the power-off. As the display device 100 does not process the power control signal for a predetermined time, only the external device 300 may respond to the power control signal, so that the powers of the display device 100 and the external device 300 are synchronized.

When the signal inputted from the external device 300 does not exist, or when the predetermined time has elapsed, the controller 170 of the display device 100 may switch the power from on to off (S213).

In particular, in FIG. 7, slightly differently from FIG. 6, even if the signal inputted to the external device 300 exists, when the predetermined time has elapsed from the time point when the power control signal is received, the controller 170 may process this situation as timeout and turn off the power. That is, in FIG. 7, when the controller 170 receives the power control signal for controlling the power to be turned off, but the signal is inputted from the external device 300, the controller 170 delays the power-off for a predetermined time and only the external device 300 operates according to the power control signal while the power-off of the display device 100 is delayed. Therefore, the powers of both the display device 100 and the external device 300 may be controlled to be off.

As described above, according to the first embodiment, the display device 100 may match the power state with the remote control device 200 by not processing the signal received from the remote control device 200 for a predetermined time.

Figure 8:
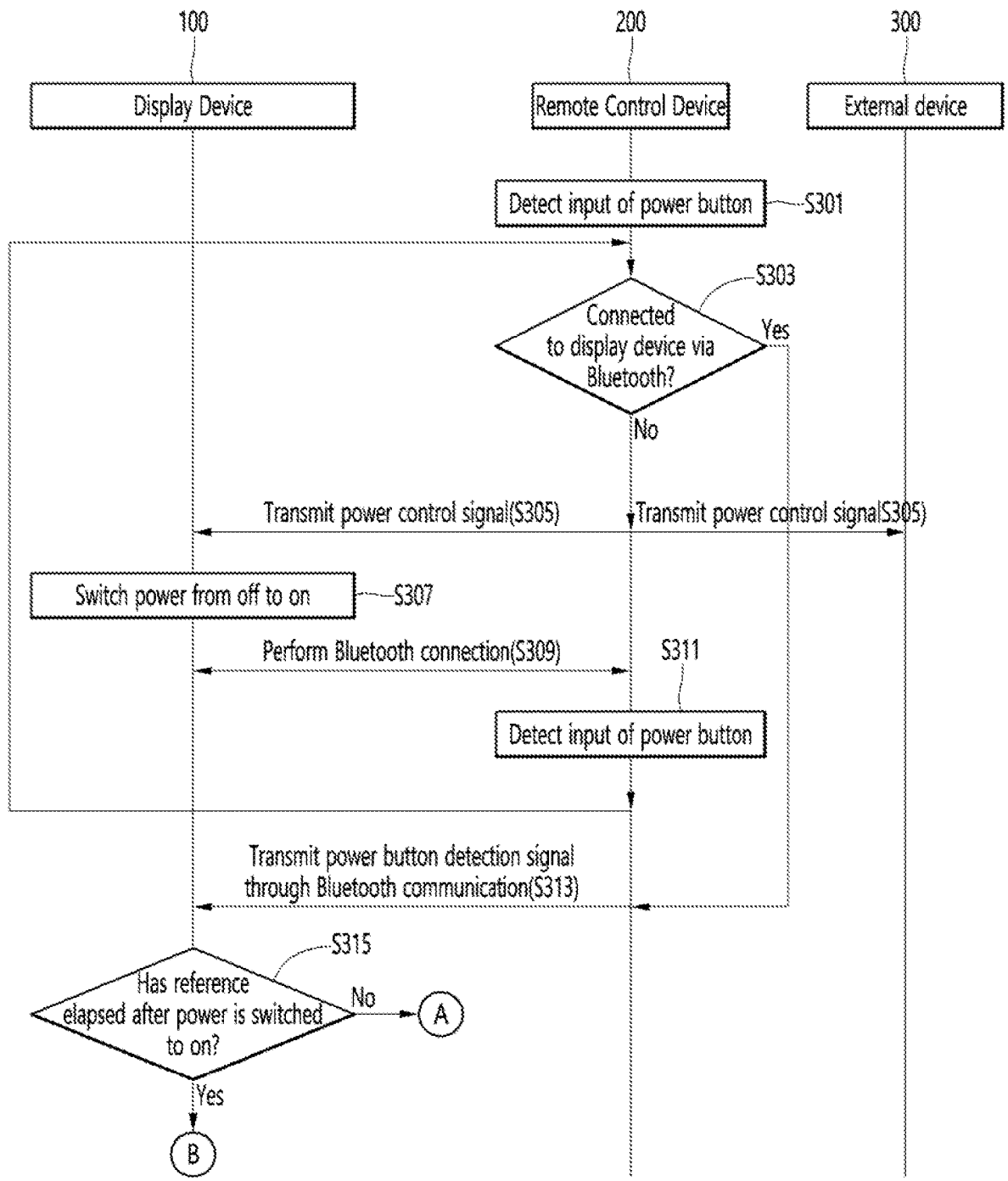
FIGS. 8 to 10 are flowcharts illustrating an operating method of a display system according to a second embodiment of the present disclosure.
Figure 9:
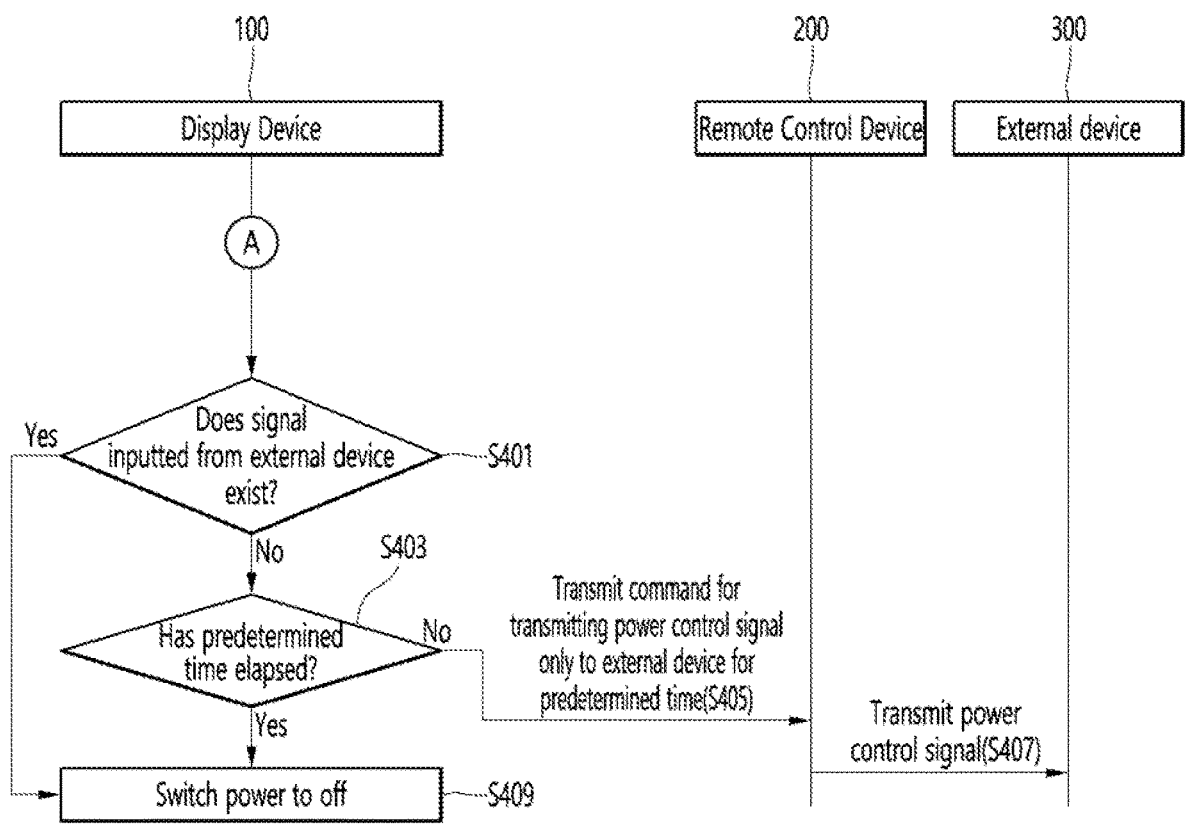
Figure 10:
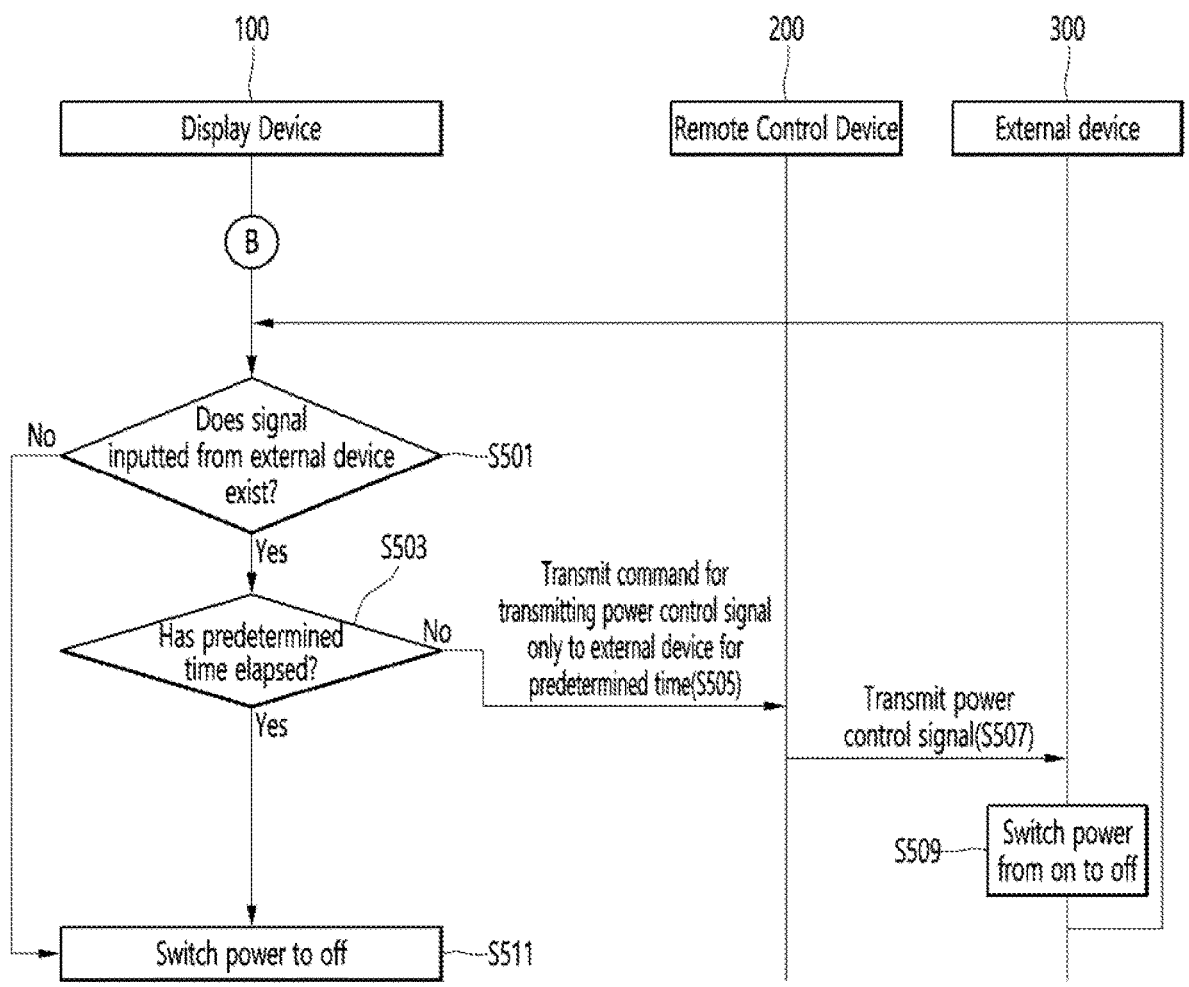

Next, FIGS. 8 to 10 are flowcharts illustrating an operating method of a display system according to a second embodiment of the present disclosure.

Referring to FIG. 8, the remote control device 200 may detect the input of the power button 231 (S301).

According to the second embodiment, when the input of the power button 231 is detected, the remote control device 200 may determine whether the remote control device 200 is connected to the display device 100 via Bluetooth (S303).

Specifically, according to the second embodiment, the display device 100 may perform a Bluetooth connection with the remote control device 200 when the power is switched from off to on. That is, the display device 100 may be connected to the remote control device 200 via Bluetooth while the power is on. Therefore, when the input of the power button 231 is detected, the remote control device 200 may recognize the power state of the display device 100 by determining whether the remote control device 200 is connected to the display device 100 via Bluetooth before transmitting the power control signal to the display device 100.

When the remote control device 200 determines that the remote control device 200 is not connected to the display device 100 via Bluetooth, the remote control device 200 may transmit the power control signal to each of the display device 100 and the external device 300 (S305).

In this case, the power control signal may be an IR signal.

The external device 300 may receive the power control signal from the remote control device 200. When the external device 300 receives the power control signal, the power state of the external device 300 may be changed. For example, when the external device 300 receives the power control signal in the power-on state, the external device 300 may switch the power from on to off, and when the external device 300 receives the power control signal in the power-off state, the external device 300 may switch the power from off to on.

Likewise, the display device 100 may receive the power control signal from the remote control device 200. When the display device 100 receives the power control signal, the power state of the display device 100 may be changed. For example, if the display device 100 receives the power control signal when the power is on, the display device 100 may switch the power from on to off, and if the display device 100 receives the power control signal when the power is off, the display device 100 may switch the power from off to on.

That the display device 100 receives the IR signal for controlling the power in operation S305 means that the power control signal is received when the power of the display device 100 is turned off as described above, and when the display device 100 receives the IR signal for controlling power, the display device 100 may switch the power from off to on (S307).

When the controller 170 of the display device 100 switches the power to on, the controller 170 may perform a Bluetooth connection with the remote control device 200 (S309).

In this manner, the remote control device 200 may detect the input of the power button 231 when the remote control device 200 is in a state of being connected to the display device 100 via Bluetooth.

When the input of the power button 231 is detected, the remote control device 200 may determine whether the remote control device 200 is connected to the display device 100 via Bluetooth (S303).

If the remote control device 200 is in a state of being connected to the display device 100 via Bluetooth when the input of the power button 231 is detected, the remote control device 200 may transmit a power button detection signal to the display device 100 through Bluetooth communication (S313).

The power button detection signal is a signal including information indicating that the input of the power button 231 provided in the remote control device 200 has been detected. The power button detection signal may be transmitted from the remote control device 200 to the display device 100 via Bluetooth.

That is, if the remote control device 200 detects the input of the power button 231 in a state of being connected to the display device 100 via Bluetooth, the remote control device 200 may transmit the power button detection signal to the display device 100 via Bluetooth, instead of immediately transmitting the IR signal for controlling the power to the display device 100.

When the display device 100 receives the power button detection signal from the remote control device 200 through Bluetooth communication, the display device 100 may determine whether a reference time has elapsed after the power is switched to on (S315).

The controller 170 may determine whether the elapsed time after the power is switched to on is within a reference time.

Similar to that described above with reference to FIG. 5, the reference time may refer to a time that is a criterion for determining the intention of the user to press the power button 231. For example, the reference time may be 6 seconds, but this is only an example and the present disclosure is not limited thereto.

When the elapsed time after the power is switched to on is within the reference time, the controller 170 may determine that the received power control signal is a signal for synchronizing the powers of both the display device 100 and the external device 300 to on. Meanwhile, when the elapsed time after the power is switched to on exceeds the reference time, the controller 170 may determine that the received power control signal is a signal for synchronizing the powers of both the display device 100 and the external device 300 to off.

First, a case in which the controller 170 receives the power button detection signal from the remote control device 200 through Bluetooth communication in a state in which the elapsed time after the power is switched to on is within the reference time will be described in detail.

FIG. 9 is a flowchart illustrating a method by which a display device is operated to be controlled to power-on with an external device according to a second embodiment of the present disclosure.

Referring to FIG. 9, when the controller 170 of the display device 100 receives the power button detection signal in a state in which the elapsed time after the power is switched to on is within the reference time, the controller 170 may determine that the signal inputted from the external device 300 exists (S401).

The external device 300 outputs a signal (e.g., an HDMI signal) to the display device 100 when the power is on, and does not output a signal to the display device 100 when the power is off. Therefore, the controller 170 of the display device 100 detects the signal inputted from the external device 300 and determines the power state of the external device 300.

When the signal inputted from the external device 300 does not exist, the controller 170 of the display device 100 may determine whether a predetermined time has elapsed (S403).

Similar to that described above with reference to FIGS. 5 to 7, the predetermined time may refer to a reference time for grasping the intention of power synchronization between the display device 100 and the external device 300. For example, the predetermined time may be 6 seconds, but this is exemplary for convenience of description and the present disclosure is not limited thereto.

When the signal inputted from the external device 300 does not exist and a predetermined time has not elapsed, the controller 170 of the display device 100 may transmit, to the remote control device 200, a command for transmitting the power control signal only to the external device 300 for a predetermined time (S405).

That is, when the signal inputted from the external device 300 does not exist and a predetermined time has not elapsed, the controller 170 of the display device 100 may control the remote control device 200 not to transmit the power control signal to the display device 100 for a predetermined time.

Therefore, the remote control device 200 may transmit the power control signal as the IR signal only to the external device 300 in response to the detection of the input of the power button 231 (S407).

Therefore, when the user inputs the power button 231, but only the power of the display device 100 is turned on and the power of the external device 300 is not turned on, the user may input the power button 231 again within a predetermined time, so as to control the powers of both the display device 100 and the external device 300 to be turned on. That is, according to the present disclosure, there is an advantage of providing user convenience that enables the user to synchronize the powers of the display device 100 and the external device 300 to on just by inputting the power button 231 again.

Meanwhile, when the signal inputted from the external device 300 exists, the controller 170 of the display device 100 may switch the power to off (S409).

Since this is the case in which the power control signal is received when both the display device 100 and the external device 300 are in the power on state, the received power control signal is recognized as the signal for turning off the power of the display device 100.

In addition, when the signal inputted from the external device 300 does not exist, or when the predetermined time has elapsed, the controller 170 of the display device 100 may switch the power to off (S409).

Similarly, since this is the case in which the power control signal is received after a predetermined time has elapsed from the power-on of the display device 100, the received power control signal is recognized as the signal for turning off the power of the display device 100.

Next, a case in which the controller 170 receives the power button detection signal in a state in which the reference time has elapsed after the power is switched to on will be described in detail.

FIG. 10 is a flowchart illustrating a method by which a display device is operated to be controlled to power-off with an external device according to a second embodiment of the present disclosure.

Referring to FIG. 10, when the controller 170 of the display device 100 receives the power button detection signal in a state in which the reference time has elapsed after the power is switched to on, the controller 170 may determine that a signal inputted from the external device 300 exists (S501).

Since this is similar to that described above with reference to operation S401, redundant descriptions thereof will be omitted.

When the signal inputted from the external device 300 does not exist, the controller 170 of the display device 100 may determine whether a predetermined time has elapsed (S403).

Since the predetermined time is similar to that described above with reference to FIGS. 5 to 7, redundant descriptions thereof will be omitted.

When the signal inputted from the external device 300 does not exist and the predetermined time has not elapsed, the controller 170 of the display device 100 may transmit, to the remote control device 200, a command for transmitting the power control signal only to the external device 300 for a predetermined time (S505).

Specifically, when the signal is inputted from the external device 300, the controller 170 may control the remote control device 200 not to transmit the power control signal to the display device 100 for a predetermined time.

That is, when the signal is inputted from the external device 300, it is difficult for the display device 100 to determine whether the user intends to turn off the power of the display device 100. Therefore, the display device 100 may delay the power-off of the display device 100 for a predetermined time. Therefore, only the external device 300 may respond to the input of the power button 231 of the remote control device 200, and the synchronization of the powers of the display device 100 and the external device 300 may be intended.

That is, the remote control device 200 may transmit the power control signal only to the external device 300 based on the command received from the display device 100 (S507), and the external device 300 may switch the power from on to off (S509).

In this manner, when the power of the external device 300 is controlled to be off, the controller 170 of the display device 100 may determine that the signal inputted from the external device 300 does not exist, and may switch the power from on to off (S511).

In addition, the controller 170 of the display device 100 may switch the power from on to off even when the predetermined time has elapsed (S511).

Therefore, the display device 100 and the external device 300 may be controlled so that the powers thereof are synchronized to be off.

According to the present disclosure, as a power button of a remote control device is inputted regardless of a power state of a display device and a power state of an external device, the power of the display device and the power of the external device are synchronized.

According to the present disclosure, the power button provided in the remote control device is used as it is, but since an IR signal is transmitted only to one of the display device and the external device according to the situation, there is an advantage that power can be synchronized without an additional button.

The present disclosure may be embodied as computer-readable codes on a program-recorded medium. The computer-readable recording medium may be any recording medium that stores data which can be thereafter read by a computer system. Examples of the computer-readable medium may include hard disk drive (HDD), solid state disk (SSD), silicon disk drive (SDD), read-only memory (ROM), random-access memory (RAM), CD-ROM, a magnetic tape, a floppy disk, and an optical data storage device. In addition, the computer may include the controller 170 of the display device 100. Accordingly, the above detailed description should not be construed as being restrictive in all respects and should be considered illustrative. The scope of the present specification should be determined by rational interpretation of the appended claims, and all changes within the equivalent scope of the present specification fall within the scope of the present specification.

The above description is merely illustrative of the technical idea of the present disclosure, and various modifications and changes may be made thereto by those skilled in the art without departing from the essential characteristics of the present disclosure.

Therefore, the embodiments of the present disclosure are not intended to limit the technical spirit of the present disclosure but to illustrate the technical idea of the present disclosure, and the technical spirit of the present disclosure is not limited by these embodiments.

Each of the embodiments disclosed in this specification may be implemented alone, or in combination with other embodiments.

The scope of protection of the present disclosure should be interpreted by the appending claims, and all technical ideas within the scope of equivalents should be construed as falling within the scope of the present disclosure.

What is claimed is:

1. A display device comprising:
an external device interface connected to an external device;
a user input interface configured to receive a power control signal from a remote control device; and
a controller configured to:
process the power control signal to control power of the display device to be turned on or off, based on a determination that a signal is inputted from the external device, and
ignore the power control signal for a predetermined time after the power control signal is received, based on the power control signal being received in a state in which an elapsed time after the power of the display device is switched to on within a reference time and based on the signal not being input from the external device.

2. The display device according to claim 1, wherein, when the predetermined time has elapsed, the controller is configured to control the power of the display device to be turned off according to the received power control signal.

3. The display device according to claim 1, wherein, when the power control signal is received in the state in which the elapsed time after the power of the display device is switched to on is after the reference time and the signal is inputted from the external device,
the controller is configured not to process a power control signal received for the predetermined time after the power control signal is received.

4. The display device according to claim 3, wherein, when the predetermined time has elapsed or when the signal is not inputted from the external device before the elapse of the predetermined time, the controller is configured to control the power of the display device to be turned off.

5. The display device according to claim 1, wherein, the power control signal is a power button detection signal of the remote control device transmitted through Bluetooth communication, and
wherein the controller is configured to control the remote control device not to transmit the power control signal to the display device according to presence or absence of the signal inputted from the external device.

6. The display device according to claim 5, wherein, when the power button detection signal is received in a state in which an elapsed time after the power of the display device is switched to on is within the reference time and the signal is not inputted from the external device,
the controller is configured to control the remote control device to transmit a power control signal for controlling only the external device for the predetermined time after the power button detection signal is received.

7. The display device according to claim 5, wherein, when the power button detection signal is received in a state in which an elapsed time after the power of the display device is switched to on is after the reference time and the signal is inputted from the external device,
the controller is configured to control the power of the display device to be turned off for the predetermined time after the power control signal is received.

8. The display device according to claim 5, wherein, when the power button detection signal is received in a state in which an elapsed time after the power of the display device is switched to on is after the reference time and the signal is inputted from the external device,
the controller is configured to control the power of the display device to be turned off according to the power button detection signal.

9. The display device according to claim 5, wherein, when the power button detection signal is received in a state in which an elapsed time after the power of the display device is switched to on is after the reference time and the signal is inputted from the external device,
the controller is configured to control the power of the display device to be turned off according to the power button detection signal.

10. The display device according to claim 1, wherein the reference time represents a waiting time for receiving an input of a power button of the remote control device.

11. The display device according to claim 1, wherein the predetermined time represents a time for determining a power state of the external device.

12. A display system comprising:
a display device connected to an external device; and
a remote control device configured to transmit a power control signal to the display device,
wherein the display device is configured to:
determine whether to process the power control signal based on a determination of whether a signal is inputted from the external device, and based on the power control signal being received from the remote control device, ignore the power control signal for a predetermined time after the power control signal is received, based on the power control signal being received in a state in which an elapsed time after the power of the display device is switched to on is within a reference time and based on the signal not being input from the external device.

13. The display system according to claim 12, wherein the remote control device is configured to:

when an input of a power button is detected, determine a power state of the display device based on whether the remote control device is connected to the display device via Bluetooth; and transmit a power signal to the display device through infrared ray (IR) or Bluetooth communication according to the power state of the display device.

* * * * *